(12) United States Patent
Rothfuss et al.

(10) Patent No.: US 9,673,686 B2
(45) Date of Patent: Jun. 6, 2017

(54) ELECTRONICALLY COMMUTATED DC MOTOR WITH SHIELDING

(71) Applicant: Robert Bosch GmbH, Stuttgart (DE)

(72) Inventors: Tobias Rothfuss, Buehl (DE); Michael Maelzer, Reutlingen (DE); Juergen Munz, Filderstadt (DE); Michael Hermann, Lauf (DE); Detlef Prahl, Buehl (DE); Siegmar Schoser, Kusterdingen (DE); Joerg Brandes, Baden-Baden (DE); Andreas Schiel, Gernsbach-Lautenbach (DE); Tamas Banky, Paty (HU); Zsolt Dudas, Kaposszekcs (HU)

(73) Assignee: Robert Bosch GmbH, Stuttgart (DE)

( * ) Notice: Subject to any disclaimer, the term of this patent is extended or adjusted under 35 U.S.C. 154(b) by 248 days.

(21) Appl. No.: 14/401,865

(22) PCT Filed: Apr. 29, 2013

(86) PCT No.: PCT/EP2013/058895
§ 371 (c)(1),
(2) Date: Nov. 18, 2014

(87) PCT Pub. No.: WO2013/174626
PCT Pub. Date: Nov. 28, 2013

(65) Prior Publication Data
US 2015/0171713 A1    Jun. 18, 2015

(30) Foreign Application Priority Data
May 25, 2012  (DE) .................. 10 2012 208 847

(51) Int. Cl.
*H02K 11/02*  (2016.01)
*H02K 5/16*  (2006.01)
(Continued)

(52) U.S. Cl.
CPC ............. *H02K 11/022* (2013.01); *H02K 5/16* (2013.01); *H02K 11/01* (2016.01); *H02K 11/40* (2016.01)

(58) Field of Classification Search
CPC .... H02K 5/16; H02K 11/022; H02K 11/0005; H02K 11/0089; H02K 11/01; H02K 11/40
(Continued)

(56) References Cited

U.S. PATENT DOCUMENTS 4,779,165 A * 10/1988 Elsaesser ............. G11B 17/038
310/156.05
5,243,242 A * 9/1993 Cap .................... G11B 19/2009
310/156.26
(Continued)

FOREIGN PATENT DOCUMENTS

CH           670323       5/1989
CN       101529697 A      9/2009
(Continued)

OTHER PUBLICATIONS

Bells et al., "Experience With Variable Frequency Drives and Motor Bearing Reliability," Petroleum and Chemical Industry Conference, 1998, Industry Application S. Society 45th Annual, Indianapolis, IN, USA Sep. 28-30, 1998, New York, NY, USA, IEEE, US, Sep. 28, 1998, pp. 253-262, XP010312456.
(Continued)

*Primary Examiner* — Alex W Mok
(74) *Attorney, Agent, or Firm* — Michael Best & Friedrich LLP

(57) ABSTRACT

In an electronically commutated DC motor having a stator unit (5) and a rotor unit (1) which is in the form of an external rotor, and having stationary sintered bearings (8, 9), the invention proposes that the rotor unit (1) is conductively connected to the shaft (3) in order to connect a conductive
(Continued)

shielding, which is formed on the rotor unit (1), to a defined electrical potential, and that the sintered bearing (8, 9) is conductively connected to the potential, so that the shielding of the rotor unit (1) is capacitively coupled to the potential by means of the electrically insulating, oil-filled bearing gap which is arranged between the shaft (3) and the sintered bearing (8, 9). Therefore, a sliding contact is not required.

15 Claims, 5 Drawing Sheets

(51) Int. Cl.
  *H02K 11/22* (2016.01)
  *H02K 11/01* (2016.01)
  *H02K 11/40* (2016.01)
(58) Field of Classification Search
  USPC .......................................................... 310/71
  See application file for complete search history.

(56) References Cited

U.S. PATENT DOCUMENTS

| | | | |
|---|---|---|---|
| 5,313,129 A | 5/1994 | Stewart | |
| 5,319,270 A | 6/1994 | Tanaka et al. | |
| 5,801,900 A * | 9/1998 | Elsaesser | G11B 17/038 360/98.07 |
| 6,809,898 B1 * | 10/2004 | Prochazka | F16C 19/54 310/90 |
| RE38,662 E * | 11/2004 | Elsasser | G11B 17/038 360/97.21 |
| RE38,673 E * | 12/2004 | Elsasser | G11B 17/038 360/97.21 |
| RE38,772 E * | 8/2005 | Elsasser | G11B 17/038 360/97.21 |
| 7,659,648 B2 * | 2/2010 | Brown | F04D 29/051 310/67 R |
| 7,847,452 B2 * | 12/2010 | Brown | F04D 29/051 310/67 R |
| 2001/0005106 A1 * | 6/2001 | Bell | H02K 15/12 310/85 |
| 2004/0038141 A1 * | 2/2004 | Yoshida | G03G 9/0819 430/108.3 |
| 2004/0056543 A1 * | 3/2004 | Melfi | H02K 11/40 310/68 R |
| 2009/0269105 A1 * | 10/2009 | Hano | G03G 15/0291 399/171 |
| 2009/0302864 A1 * | 12/2009 | Marinov | G01R 31/343 324/557 |
| 2010/0091476 A1 | 4/2010 | Kohler et al. | |
| 2010/0117469 A1 | 5/2010 | Niederer et al. | |
| 2012/0319636 A1 * | 12/2012 | Gattermann | G01M 13/04 318/490 |
| 2015/0171713 A1 * | 6/2015 | Rothfuss | H02K 5/16 310/71 |

FOREIGN PATENT DOCUMENTS

| | | |
|---|---|---|
| DE | 1638216 | 7/1971 |
| DE | 20021796 | 5/2002 |

OTHER PUBLICATIONS

International Search Report for Application No. PCT/EP2013/058895 dated Oct. 9, 2013 (English Translation, 3 pages).

* cited by examiner

ELECTRONICALLY COMMUTATED DC MOTOR WITH SHIELDING

BACKGROUND OF THE INVENTION

The invention relates to a DC motor having a stator unit and a rotor unit, which is connected to an electrically conductive shaft in a rotationally fixed manner, said shaft being rotatably mounted in at least one stationary sintered bearing. The DC motor also has a shielding for protection against high-frequency electromagnetic fields.

A generic DC motor is known, for example, from the German patent application DE 1 638 216 A1. It is also thereby known to provide a metal plate, which is electrically connected to ground, on the end face of the stator unit which is opposite the rotor unit, i.e. in the region of a base plate or mounting plate of the stator unit, in order to provide shielding in this axial direction.

The present invention is based on a brushless, electronically commutated DC motor (EC=electrically commutated or BLDC=brushless direct current) of flat construction in which the axial expansion of the motor is therefore small in relation to the diameter thereof. This is substantially achieved by the known external rotor design in which the rotor unit wraps around the outside of the stator unit.

Conventional BLDC motors with small capacity emit electromagnetic waves via the windings thereof during the motor operation. These radiated waves can be measured within the scope of EMC tests and are undesirable in many technical environments, for example in motor vehicles, which include other electrical devices that are susceptible to interference. In order to reduce said radiated waves, metallic shieldings, in particular the underside metallic plate that was previously mentioned with regard to the generic DC motor, can be mounted in close proximity to the windings. In the case of the external rotor, the further shielding on the opposite side can be implemented by a metallic rotor mounted in close proximity to the stator. In order to achieve an effective shielding, it is not sufficient to surround the components to be shielded with conductors. Said components have to be contacted to ground. Otherwise, in the worst case, the shielding itself can couple or decouple high-frequency energy while functioning like an antenna and thereby worsen the interference problem. The electrical connection to the rotating rotor shielding required here is however not easily produced. It can, in fact, occur in a known manner via a sliding contact, which however requires additional components and presents a problem with regard to service life.

The German patent application DE 10 2007 019 431 A1 discloses interference suppression measures for a brush motor, within the scope of which the rotor shaft is galvanically coupled via a bearing of the shaft and a connection means for contacting the bearing to a reference potential, in particular a supply potential, in an electrically conductive manner.

The German patent application DE 10 2006 024 551 A1 discloses a method for shielding an electronic device, in particular a circuit, which is surrounded by a conductive cap, in which planar regions of the cap are arranged in an electrically insulated manner at a small distance from and parallel to a planar region of a conductor of a reference potential; thus enabling a capacitive coupling of the cap to the reference potential to occur.

SUMMARY OF THE INVENTION

It is therefore the aim of the invention to create an improved DC motor of the type mentioned at the beginning of the application, which ensures with regard to the shielding a simple and less costly conductive contacting of the rotating rotor.

In order to connect a conductive shielding formed on the rotor unit to a defined electrical potential, the DC motor according to the invention, in going beyond the generic features, involves the conductive connection of the shielding of the rotor unit to the shaft. According to the invention, the sintered bearing is furthermore conductively connected to the potential, so that the shielding of the rotor unit is capacitively coupled to the potential by means of the at least partially electrically insulating, oil-filled bearing gap which is arranged between the shaft and the sintered bearing.

The concept underlying the invention is that a connection which is particularly electrically conductive in the high-frequency range, namely a capacitive electrical coupling, is used by means of the sintered bearing to connect the rotating shaft to a stationary bearing bushing in an electrically conductive manner; and thus ultimately enabling the rotor shielding to be electrically connected to the reference potential. The sliding contact which is otherwise required for contacting the rotating rotor can therefore advantageously be omitted.

According to a first modification to the invention, the rotor unit comprises a metallic pole housing which is of pot-shaped design and forms the shielding; thus enabling the rotor unit itself to substantially form the shielding in this region of the motor.

In a modification to the invention which is considered to be particularly advantageous, the shaft is rotatably mounted in a first and second sintered bearing which are axially spaced apart from one another and are in each case conductively connected to the defined potential, so that two parallel capacitive couplings of the shaft to the potential result. As a result of the higher capacity, the high-frequency interferences which are generated by the motor and couple into the rotor shielding can be better discharged via the capacitive coupling to the mass potential.

According to a further modification to the invention, a metal plate connected to the defined potential is provided for further shielding the motor in the axial direction that is opposite the shielding of the rotor unit. The metal plate is disposed on the end face of the stator unit that faces away from the rotor unit and is conductively connected via a connection means to at least one sintered bearing in order to produce the capacitive coupling. In so doing, the complete shielding of the motor is made possible.

Because it is evident from measurements, that it is more favorable to use at least the upper first sintered bearing, which is arranged in the region of the end face of the stator unit that faces the rotor unit, for capacitive coupling, it is advantageous for the connection means to comprise a pin that is preferably integrally connected to the metal plate and extends in the axial direction from the metal plate through the stator unit into the region of the end face thereof which faces the rotor unit. The aforementioned pin opens up the possibility of a simple contacting of the upper sintered bearing. In a modification to this embodiment, said pin is encased with a dome-shaped plastic overmold in the proximity of the free end thereof, so that moisture cannot penetrate into the motor from the free end thereof.

Besides the rotor unit, a fan wheel is fastened to the shaft in a rotationally fixed manner; thus enabling the DC motor to be designed or used as a fan motor comprising integrated commutating electronics.

BRIEF DESCRIPTION OF THE DRAWINGS

The invention is described below in detail with the aid of exemplary embodiments. In the drawings.

DETAILED DESCRIPTION

Figure 1:
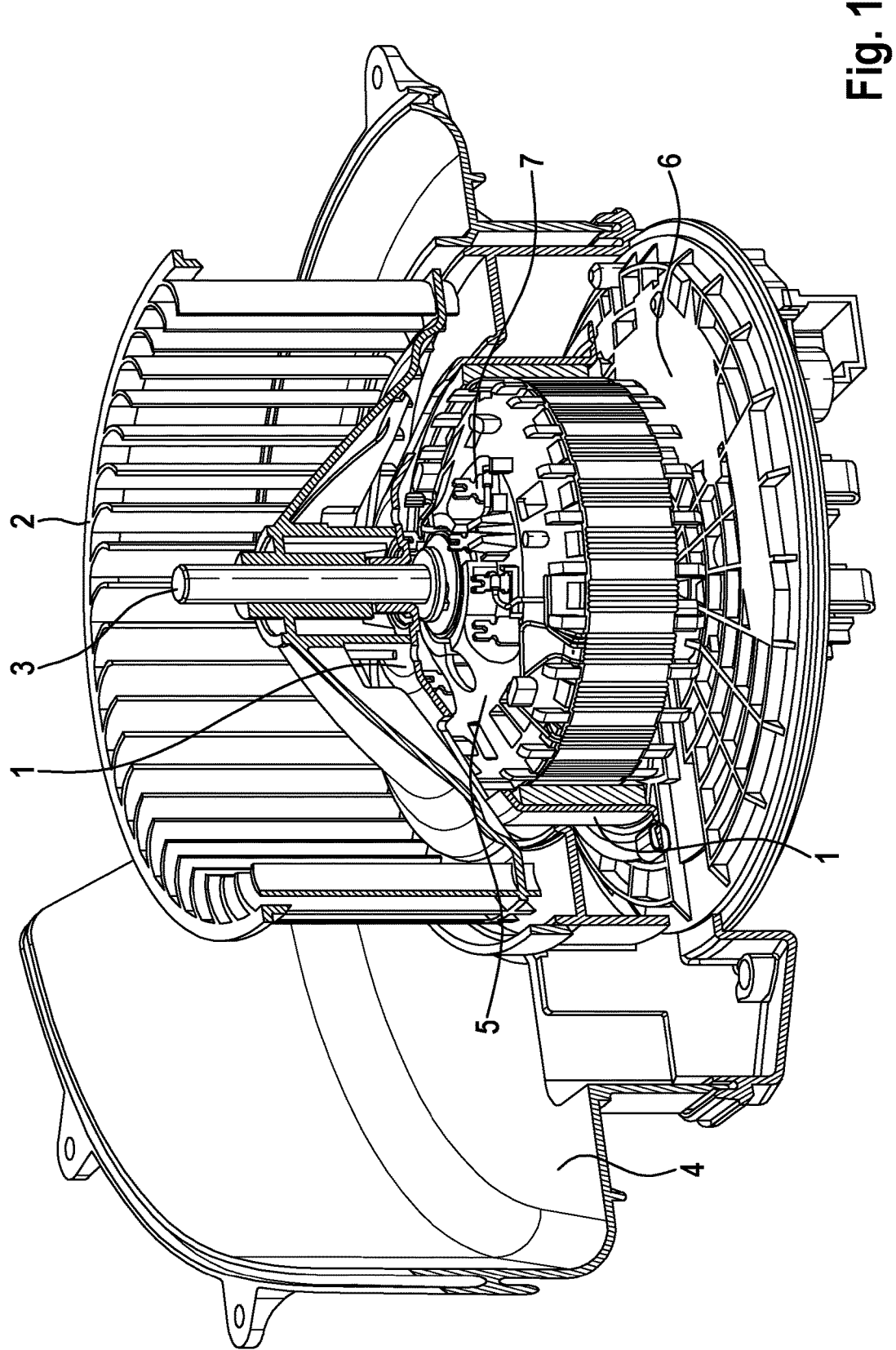
FIG. 1 shows a perspective partially cut-away depiction of an inventive DC motor comprising a fan wheel.
Figure 2:
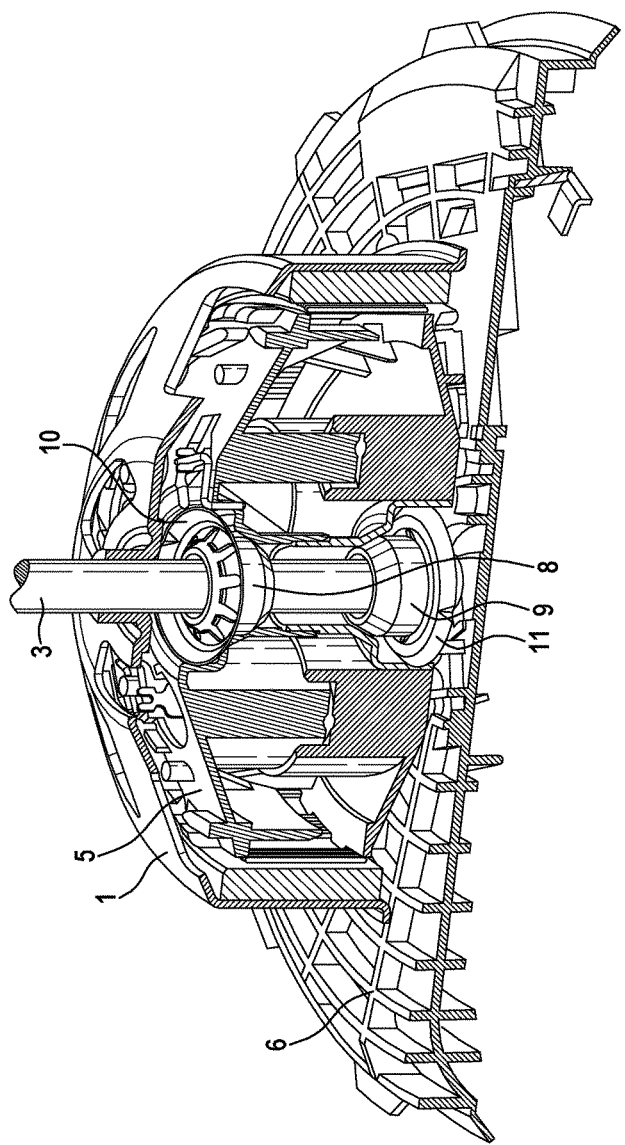
FIG. 2 shows the DC motor according to FIG. 1 without the fan wheel, however with a cut-away stator and rotor unit.

A cross section through the air duct 4 of an exemplary embodiment of the DC motor is depicted in FIG. 1. A preferred application of the DC motor of flat design is the use as a fan for the air conditioning unit of a motor vehicle. To this end, a relevant fan wheel 2 is fastened to the rotating shaft 3, said fan wheel drawing in air via the air duct 4 from the exterior area of the vehicle. The rotor unit 1, which is likewise disposed on the shaft 3 in a rotationally fixed manner, consists of a metallic pole housing which is designed in a pot-shaped manner and on the interior of which magnets are fastened that interact with the coils of the stator unit 5 in a manner know per se during the operation of the electric motor, said stator unit being disposed in the pot of the rotor unit 1 and fastened to the housing flange 6. The mounting of the rotating shaft 3 in a first and second sintered bearing 8 or respectively 9, which are axially spaced apart from one another at a distance corresponding approximately to the installation height of the stator unit 5, can be seen in FIG. 2. The sintered bearings 8 and 9 which are designed as dome-shaped bush bearings are seated in the so-called insulating mask of the stator unit 5, wherein a clamping collar 10 or 11 is provided in each case and presses the respective sintered bearing into the respective seat. The sintered bearings known per se are slide bearings which consist, for example, of sintered iron, a very porous material, which can accommodate a large supply of lubricant (oil) during operation.

A printed circuit board comprising the commutating electronics for the BLDC motor is disposed below the housing flange 6. Terminal pins 7 which transmit the commutating signals from the electronics to the coils of the stator unit 5 can furthermore be seen in FIG. 1. The housing flange 6 is depicted in isolation in FIG. 3, wherein four (respectively two for each terminal pin 7 of the two coils) domes extrusion-coated with the plastic of the flange 6 are provided. Recesses for the dome-shaped plastic overmolds are provided in the stator unit 5; thus enabling the stator unit (5) to be fitted (elastically) to the domes 12. In so doing, the region around the terminal pins 7 is sealed in a moisture-proof manner by the domes 12. Without the domes 12 an undesirable penetration of moisture from the outside air being drawn into the DC motor would otherwise be practically impossible to prevent.

Because the carrier frequency of the commutating signals is 23 kHz, high-frequency electromagnetic fields are generated which require a shielding of the DC motor. To this end, a metal plate 13, cf. FIG. 4, having a ground connection (not depicted) is provided in a manner known per se on the bottom end face of the stator unit 5, more precisely stated below the housing flange, said metal plate serving as a magnetic shielding of the motor in this axial direction. In order to implement the further shielding of the motor by means of the pole housing of the rotor unit 1 or a conductive shielding mounted thereon, a conductive contacting of the rotor unit 1 to the metal plate 13 that is connected to ground is required, which is not readily possible due to the rotary motion. For example, a conventional galvanic coupling via bearing 8 and shaft 3 is not possible because the oil-filled bearing gap is located between the two conductive parts. The oil-filled bearing gap does in fact more or less contain metallic abrasion particles but does not enable any sufficient ohmic connection, in particular not in all of the operating states. According to the invention, a capacitive coupling is instead implemented, in particular via the first, upper sintered bearing 8.

Figure 3:
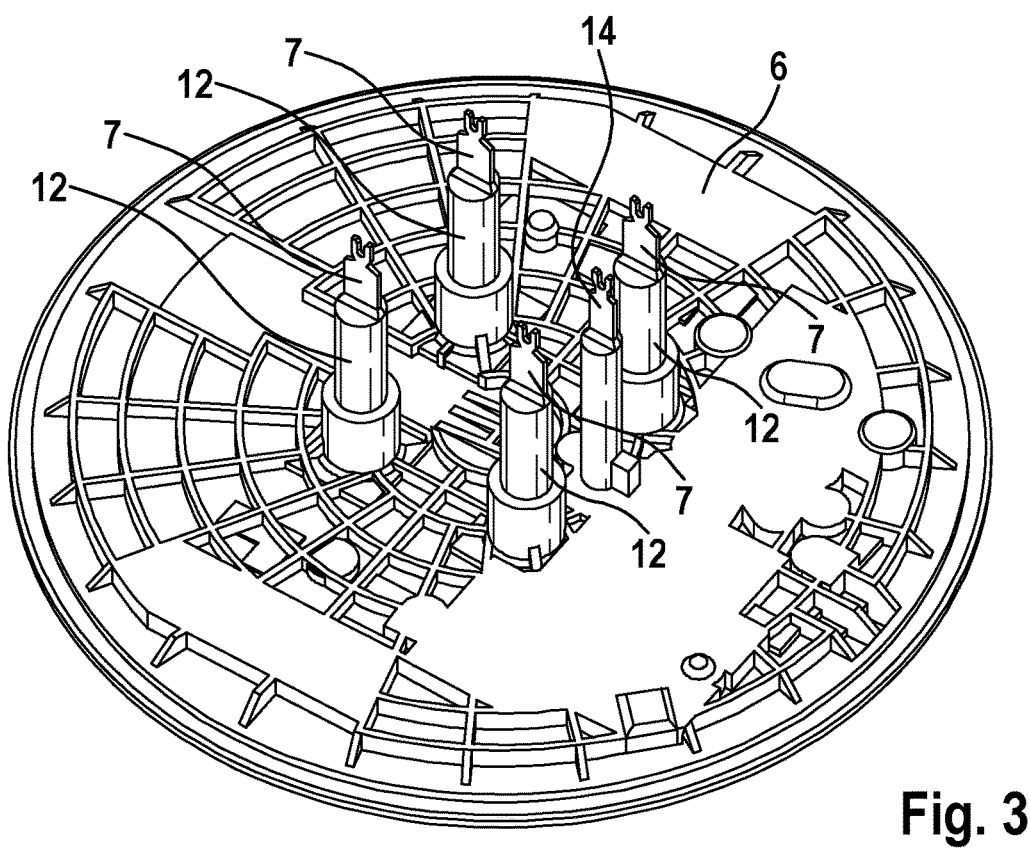
FIG. 3 shows a perspective view of a housing flange made of plastic and comprising pins which are extrusion-coated in a dome-shaped manner.
Figure 4:
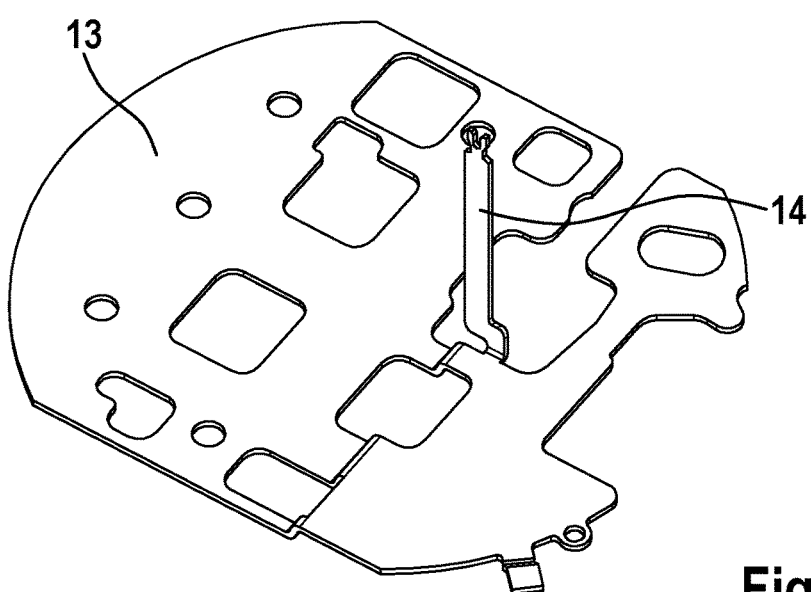
FIG. 4 shows a view of a metal plate for shielding in the axial direction comprising an attached pin for electrically connecting the metal plate to a sintered bearing.

In order to enable an electrical contacting of the first sintered bearing 8, a pin 14 which is integrally connected to the metal plate 13 is provided, as depicted in FIG. 4, said pin extending axially up into the region of the end face of the stator unit 5 which faces the rotor unit 1. Said pin 14 is, as can be seen in FIG. 3, also provided with a dome-shaped plastic overmold 12.

Figure 5:
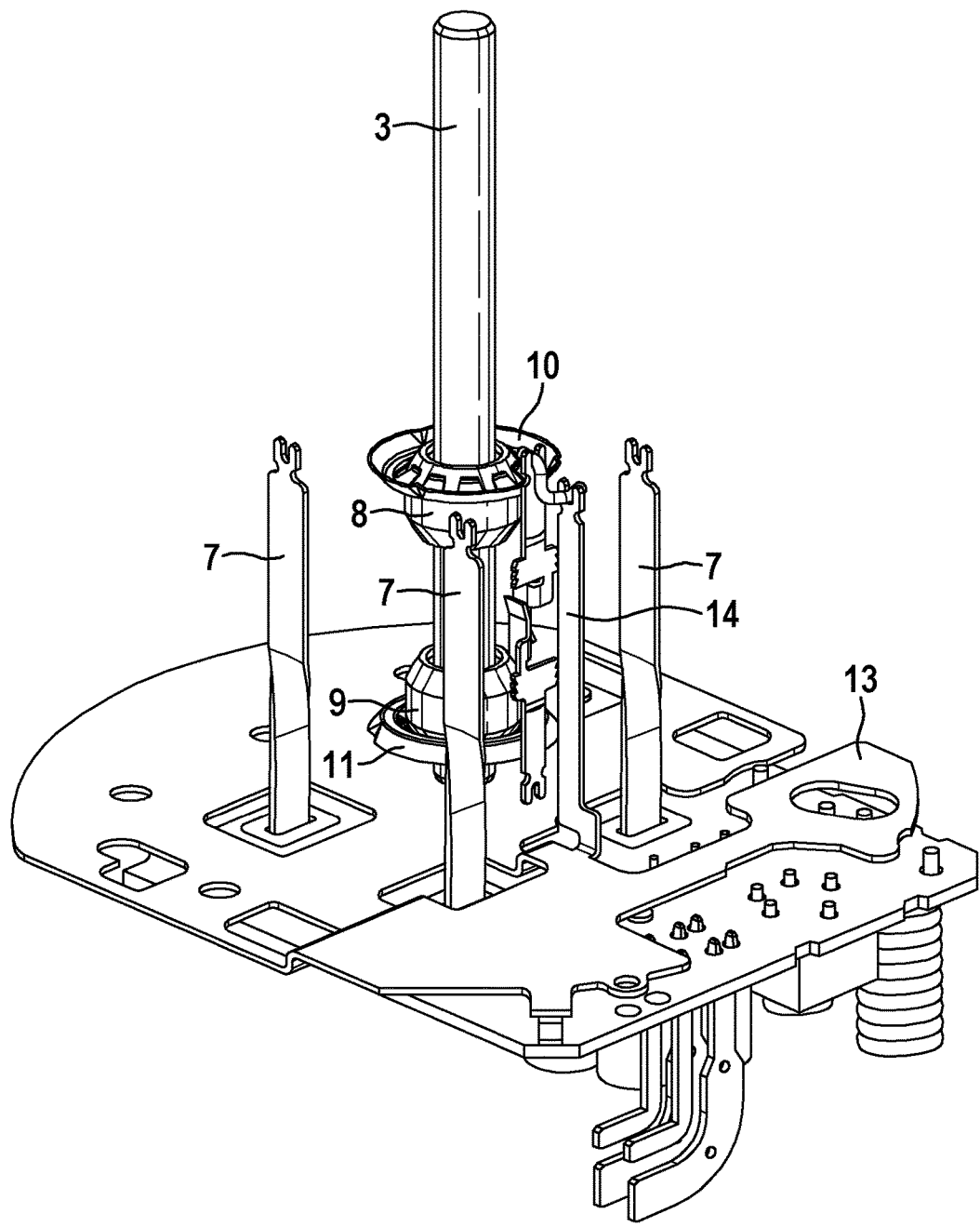
FIG. 5 shows a perspective view of components of the shielding of the DC motor according to the invention.
Figure 6:
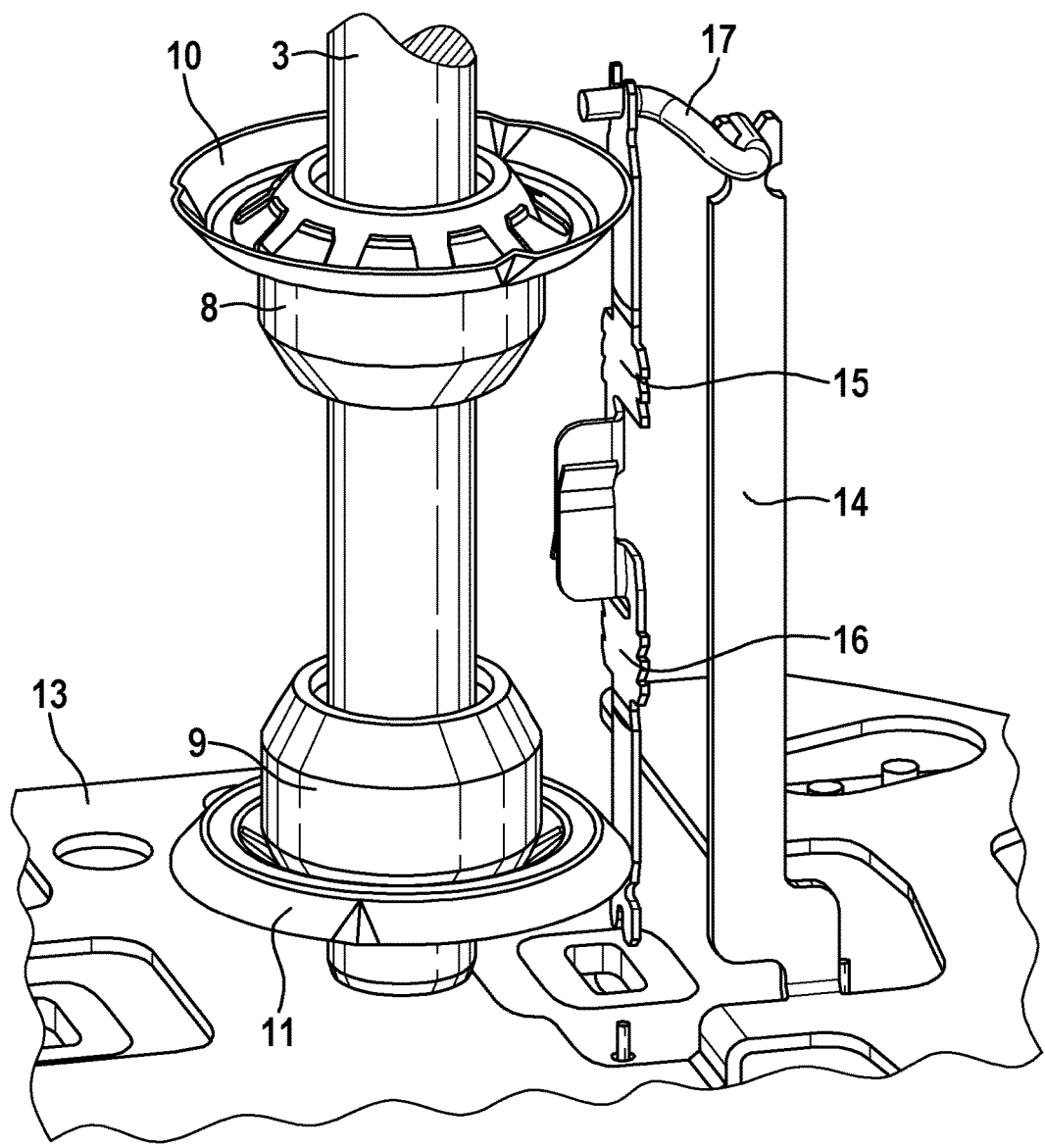
FIG. 6 shows an enlarged partial view of the components from FIG. 5.

The electrical contacting takes place advantageously at the clamping collar 10 of the sintered bearing 8, i.e. via the path: electrical contact, clamping collar, sintered bearing, lubrication gap, shaft, rotor unit (pole housing), cf. FIG. 5 and FIG. 6. The connection means from the metal plate 13, which is connected to the reference potential, to the outer surface of the sintered bearing 8 or, respectively, to the clamping collar 10 comprises, besides the pin 14, a first contact spring 15 which is arranged axially and resiliently abuts against the first sintered bearing 8, in particular against a conductive first clamping collar 10 that presses the first bearing 8 into the seat thereof. In order to complete the connection means for contacting the two bearings 8 and 9, a second contact spring 16 that extends in the axial direction is advantageously connected up electrically and mechanically to the end of the first contact spring 15 that faces away from the rotor unit 1. Said second contact spring 16 resiliently abuts against the second sintered bearing 9, in particular against a conductive second clamping collar 11 which presses the second bearing 9 into the seat thereof. In addition, the connection means comprises a litz wire 17, cf. FIG. 6, for the electrical connection of ends of the pin 14 that face the rotor unit 1 to the first contact spring 15.

What is claimed is:

1. A DC motor, comprising a stator unit (5) and a rotor unit (1) which is connected to an electrically conductive shaft (3) in a rotationally fixed manner, said shaft being rotatably mounted in at least one stationary sintered bearing (8, 9), characterized in that a shielding of the rotor unit (1) is conductively connected to the shaft (3) in order to connect a conductive shielding, which is formed on the rotor unit (1), to a defined electrical potential and in that the sintered bearing (8, 9) is conductively connected to the potential, so that the shielding of the rotor unit (1) is capacitively coupled to the potential by means of an at least partially electrically insulating, oil-filled bearing gap which is arranged between the shaft (3) and the sintered bearing (8, 9), wherein current is discharged from the shielding of the rotor unit (1) to the potential via the at least partially insulating, oil-filled bearing gap.

2. The DC motor according to claim 1, characterized in that the rotor unit (1) comprises a pot-shaped metallic pole housing which forms the shielding of the rotor unit.

3. The DC motor according to claim 1, characterized in that the shaft (3) is rotatably mounted in a first sintered bearing (8) and a second sintered bearing (9) which are axially spaced apart from one another and are in each case conductively connected to the defined potential, providing two parallel capacitive couplings of the shaft (3) to the potential.

4. The DC motor according to claim 1, characterized in that a metal plate (13) connected to the defined potential is provided for additional shielding of the motor in an axial direction that is opposite the shielding of the rotor unit (1), said metal plate being disposed on an end face of the stator unit (5) that faces away from the rotor unit (1) and being conductively connected to at least one sintered bearing (8, 9) via a connection means (14, 15, 16, 17).

5. The DC motor according to claim 4, characterized in that a first sintered bearing (8) is disposed in a region of an end face of the stator unit (5) that faces the rotor unit (1) and in that the connection means (14, 15, 16, 17) comprises a pin (14).

6. The DC motor according to claim 5, characterized in that the pin (14) is encased with a dome-shaped plastic overmold to a point in close proximity to a free end of the pin.

7. The DC motor according to claim 5, characterized in that the connection means comprises a first contact spring (15) which is arranged axially and abuts resiliently against the first sintered bearing (8).

8. The DC motor according to claim 7, characterized in that a second contact spring (16) which extends in the axial direction is connected in an electrically conductive manner to an end of the first contact spring (15) that faces away from the rotor unit (1), said second contact spring abutting resiliently against the second sintered bearing (9).

9. The DC motor according to claim 7, characterized in that an end of the pin (14) which faces the rotor unit (1) and an end of the first contact spring (15) are connected electrically to one another by means of a litz wire (17).

10. The DC motor according to claim 4, characterized in that a first sintered bearing (8) is disposed in a region of an end face of the stator unit (5) that faces the rotor unit (1) and in that the connection means (14, 15, 16, 17) comprises a pin (14) which is integrally connected to the metal plate (13) and extends in the axial direction from the metal plate (13) through the stator unit (5) up into the region of the end face thereof that faces the rotor unit (1).

11. The DC motor according to claim 10, characterized in that the pin (14) is encased with a dome-shaped plastic overmold to a point in close proximity to a free end of the pin.

12. The DC motor according to claim 10, characterized in that the connection means comprises a first contact spring (15) which is arranged axially and abuts resiliently against an electrically conductive first clamping collar (10) which presses the first bearing (8) into a seat thereof.

13. The DC motor according to claim 12, characterized in that a second contact spring (16) which extends in the axial direction is connected in an electrically conductive manner to an end of the first contact spring (15) that faces away from the rotor unit (1), said second contact spring abutting resiliently against an electrically conductive second clamping collar (11) which presses the second bearing (9) into a seat thereof.

14. The DC motor according to claim 1, characterized in that a fan wheel (2) is fastened to the shaft (3) in a rotationally fixed manner outside of the rotor unit (1) and in that the DC motor is a fan motor comprising integrated commutating electronics.

15. The DC motor according to claim 1, wherein the current is provided by high-frequency interference generated by the motor.

* * * * *